Feb. 6, 1968

L. S. SMITH 3,367,573

MINIATURE PNEUMATIC THERMOSTAT

Filed Aug. 11, 1966

INVENTOR
LARRY S. SMITH

BY *Anthony A. O'Brien*

ATTORNEY

United States Patent Office 3,367,573
Patented Feb. 6, 1968

3,367,573
MINIATURE PNEUMATIC THERMOSTAT
Larry S. Smith, Goshen, Ind., assignor to Robertshaw Controls Company, Richmond, Va., a corporation of Delaware
Filed Aug. 11, 1966, Ser. No. 571,771
8 Claims. (Cl. 236—87)

This invention relates to thermostat devices for controlling the temperature of a space or room, and more particularly, to a miniature pneumatic thermostat of the type that is usually mounted on a wall.

An object of the present invention is to miniaturize a pneumatic thermostat by means of relatively simp'e and economical components.

This invention has another object in that the set point of pneumatic thermostat is adjusted by movement of the dial thereof.

Another object of this invention is to provide camming means between the dial and a casing of a thermostat for effecting the temperature setting thereof.

This invention has another object in that calibration of a pneumatic thermostat may be effected without removal of any components thereof.

It is another object of the present invention to modulate a pneumatic flow through a thermostat to the atmosphere in response to ambient temperature sensed at the thermostat.

Another object of this invention is to utilize a bimetal strip to bias a ball valve in opposition to a pneumatic pressure acting on the ball valve.

A further object of this invention is to actuate a ball valve by a bimetal strip which is retained thereagainst by retaining means for the bimetal strip.

Still another object of the present invention is to provide a pneumatic thermostat with a bimetal actuator that is mounted in the thermostat casing without any rigid or integral connections thereto.

In practicing the present invention, a preferred embodiment is arranged in a pneumatic thermostat including a casing having pneumatic port means adapted to receive a pneumatic flow, valve means in the casing controlling the pneumatic port means, bimetal means for actuating the valve means, range spring means attached to the bimetal means, and adjustment means defining an operative connection between the temperature setting means and the range spring means for adjusting the same to a desired set point, the adjustment means retaining the temperature setting means in assembled relationship on the casing.

Other objects and advantages of the present invention will become apparent from the following description of a preferred embodiment taken in conjunction with the accompanying drawing wherein.

Figure 1:
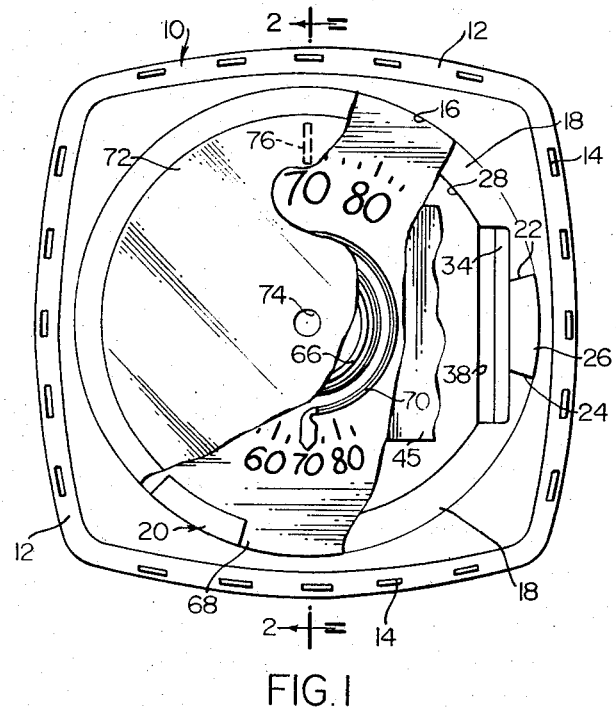
FIG. 1 is a front elevational view, with parts broken away, of a thermostat control device embodying the present invention.

A preferred embodiment of the present invention is illustrated in FIG. 1 as being embodied in a space condition responsive device, such as a room or wall thermostat including a casing 10 which is adapted to be mounted on a wall by means of a mounting plate (not shown). The casing 10 is made of any suitable rigid plastic material and has a generally rectangular configuration in elevation with its four side walls 12 sloping slightly outwardly from front to rear. A series of elongated slots 14 are provided in each side wall 12 so that the interior of the casing 10 is always subject to the ambient conditions of the surrounding atmosphere.

Figure 3:
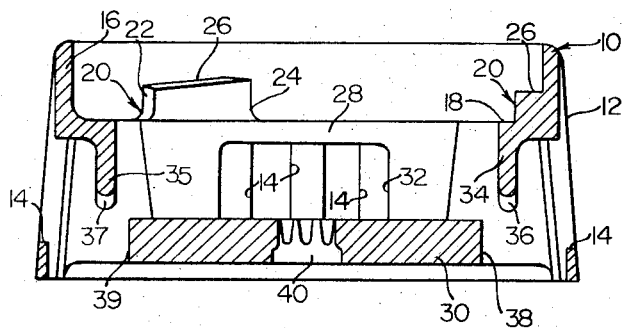
FIG. 3 is a horizontal cross section of the casing detail of FIG. 2.

The front of casing 10 has a large circular opening 16 having a depth of approximately one-third the dimension of side wall 12, where the casing has an interior annular shoulder 18. A plurality of cams 20 (in this instance three cams are used) are disposed on the annular shoulder 18 and are equally spaced from each other. Each cam 20 has small and large abutment stops 22 and 24, respective'y, with a sloping cam surface 26 therebetween. The stops 22 and 24 are perpendicular to the annular shoulder 18 and the cam surface 26 is located in a slightly inclined plane relative to annular shoulder 18. Inwardly from the annular shoulder 18, the casing has a second opening 28, generally circular in cross section, which is smaller in diameter than the opening 16 by the dimension of the annular shoulder 18 and which extends to the rear wall 30 of the casing 10. As is shown in FIG. 3, the side wall slots 14 are disposed below the annular shoulder 18 so that the mechanism, which will be described hereinafter, to be mounted on shoulder 18, may not be disturbed as by a tool being inserted through one of the slots 14. Portions of the undersurface of bottom wall 30 and casing 10 are hollowed out adjacent the periphery of the casing so that the four side walls define an outer casing wall and the surface of opening 28 defines an inner casing wall. This inner wall 28 is provided with a series of peripheral slots 32 which in conjunction with the outer wall slots 14 assure communication between the interior of the casing 10 and the surrounding atmosphere.

The periphery of the inner wall 28 is provided with a pair of flat sections 34 and 35, diametrically opposed from each other, which may be viewed as chordal sections of the circumferential wall 28. The bottom surfaces of the flat sections 34 and 35 have centrally disposed projections 36 and 37, respectively (FIG. 3). Two of the inner wall slots 32 are located under the flat sections 34 and 35 and are contiguous elongated slots 38 and 39 cut through the bottom wall 30 so as to define chordal slots underneath the flat sections 34 and 35, respectively.

The center of the bottom wall 30 has a circumferentially ribbed opening 40, into which a bored valve seat member 42 is press fitted. All of the elements described so far may be integrally formed as by molding, however, if desired the valve seat member 42 may be separately formed of a material different from the plastic casing 10. For example, the valve seat member 42 may be made of brass so that its conical seat may be accurately controlled by a steel ball valve 44.

Figure 2:
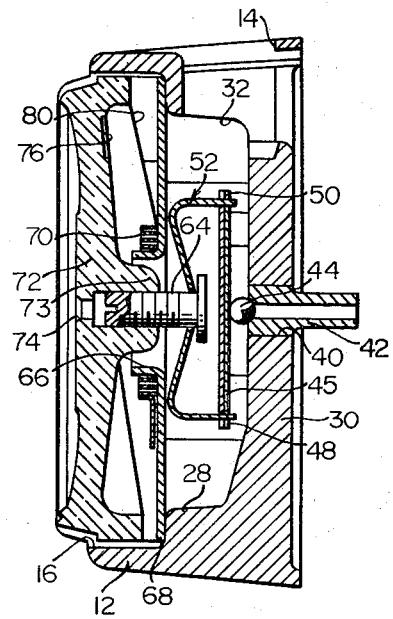
FIG. 2 is a vertical cross section taken along line 2—2 of FIG. 1.

As is illustrated in FIG. 2, the ball valve 44 is movable relative to the valve seat member 42 by a bimetal element 45 which is in the form of an elongated strip having a notch 46 centrally located on one end and an aperture 47 centrally located on its opposite end. In assembled relationship, the aperture 47 receives the internal wall projection 37 and the notch 46 receives the internal wall projection 36 whereby the bimetal 45 is retained in the casing 10 and, in turn, prevents removal of the ball valve 44 from the valve seat member 42. Intermediate its ends, the side edges of the bimetal 45 are notched at 48 and 50, respectively, for securing a range spring 52 thereto.

Figure 5:
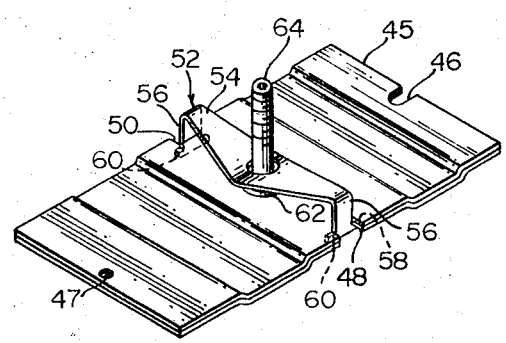
FIG. 5 is an isometric view of the bimetal assembly of FIG. 2.

The range spring 52 has a generally flattened U-shaped configuration defined by a centrally apertured strip 54 from which a pair of T-shaped legs 56 depend. Each leg 56 terminates in perpendicular tabs 58 and 60 to define the T-shape configuration thereof. Each leg 56 has a dimension to fit loosely in the respective edge notches 48 and 50 of the bimetal 45 and the leg tabs 58 and 60 and engage the opposite surface of the bimetal 45. The center strip 54 of the range spring 52 is dished inwardly by being slightly inclined from each leg 56 toward its center bore. The head 62 of a range spring adjustment screw 64 is assembled to engage the underside of the spring strip 54 before the range spring 52 is attached to the bimetal 45; the shank of screw 64 loosely extends through the central aperture of spring strip 54. As is shown in FIG. 5, the screw 64 has external threads and a hexagonal opening on its shank end to receive a suitable tool such as an Allen Hex Head key.

The sub-assembly of the bimetal 45, range spring 52 and screw 64 is mounted in the casing 10 with the center of the bimetal 45 engaging the ball valve 44 and with the bimetal end notch 46 and aperture 47 receiving casing projections 36 and 37, respectively, which retain and align the sub-assembly in the casing.

The shank end of the adjustment screw 64 extends through an enlarged opening defined by a central annular collar 66 on a scale plate 68 which rests on the casing shoulder 18. The scale plate 68 has three peripheral notches receiving the three cams 20 on the casing shoulder 18; one of the peripheral notches has a flat edge to cooperate with the flat edge of the cam 20 which is flush with and an extension of the flat section 34 on the inner wall of casing 10. The three peripheral notches prevent movement of the scale plate 68 and the flat edged notch assures proper orientation of the scale plate 68 in the casing 10. As viewed in FIG. 1, the top portion of scale plate 68 has temperature setting indicia representing degrees Fahrenheit and the lower portion of scale plate 68 has temperature indicating indicia also representing degrees Fahrenheit; of course, a single indicia scale may be used for both temperature indication and temperature setting. A conventional bimetallic coil thermometer 70 surrounds the scale plate collar 66 with its inner end fixed thereto and with its outer end terminating in a pointer to cooperate with the temperature indicating indicia on the face of the scale plate 68.

Figure 4:
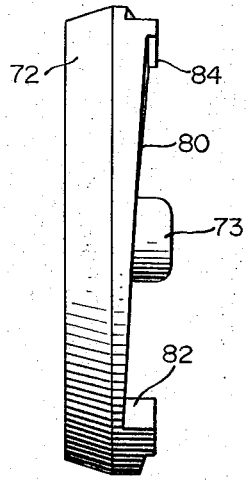
FIG. 4 is a side elevation view of the cover detail of FIG. 2.

A transparent circular dial 72 is rotatably disposed in the circular opening 18 on the front of casing 10 and has a central annular boss 73 extending into the scale plate collar 66. A central bore 74 extends through the dial 72 and the part of the bore in the boss 73 is threaded to receive threaded shank of adjustment screw 64. The top of the transparent dial 72 is notched on its undersurface to define an indicating mark 76 that cooperates with the temperature setting indicia on the scale plate 68. Adjacent its periphery, the undersurface of dial 72 is formed with three cam slopes 80 which rest on the three respective cam surfaces 26 in the casing 10. As is illustrated in FIG. 4, each cam slope 80 arcuately extends from a large transverse wall 82 to a small transverse wall 84. The walls 82 and 84 (of which there are three to conform to the number of cams 20) define stops which limit the angle of rotation for the dial 72; e.g., each large wall 82 engages the large abutment 24 on its respective cam 20 to limit counterclockwise rotation of dial 72, and each small wall 84 engages the small abutment 22 on its respective cam 20 to limit clockwise rotation of the dial 72.

In order to assemble the dial 72 to the casing 10, an Allen wrench is inserted through the dial opening 74 and into the hex head socket of the screw 64, whereupon rotation of the wrench causes the threaded shank of screw 64 to be threaded into dial boss 73 until the three cam slopes 80 engage their respective cam surfaces 26 on the casing shoulder 18. As viewed in FIG. 2, the screw 64 is displaced to the left when threaded into the dial boss 73 so that the screw head 62 abuts the depressed center of the spring strip 54, which in turn assures contact of the ends of the bimetal 45 with the undersurface of flat sections 34 and 35.

In the following description of the sequence of operation of the pneumatic thermostat, it will be assumed that the valve seat element 42 and its pneumatic port is connected to a pneumatic control system whereby the valve seat element 42 is supplied with a pneumatic pressure that is branched from the main pneumatic flow. Assuming now that the dial 72 has been rotated to a set point temperature of 70° F., the components will be in their relative positions as shown in FIGS. 1 and 2 with the dial index 76 superimposed on the 70° F. marking of the temperature setting indicia on the scale plate 68, and with the dial slopes 80 being engaged at their mid points on the respective camming surfaces 26.

With the actual temperature at 70° F., as measured by the thermometer 70 from the ambient atmosphere, the ball valve 44 is balanced against the force of the pneumatic pressure in the pneumatic port by the combined forces of the range spring 52 and the bimetal 45. It should be noted that the range spring 52 always opposes the bimetal load on the ball valve 44 and that with an increase in ambient temperature, the bimetal 45 increases its load on the ball valve 44. Thus, the bimetal 45 achieves a pneumatic pressure output which is modulated in accordance with ambient temperature variations. If the ambient temperature rises above 70° F., the bimetal moves the ball valve 44 toward the valve seat 42 and the modulated flow therethrough is reduced; of course, a substantial increase in ambient temperature would close the ball valve 44 on the valve seat 42. Conversely, a decrease in ambient temperature causes the bimetal 45 to decrease its load on the ball valve 44 so that the modulated flow through the valve seat is increased.

The temperature set point is achieved by rotation of the dial 72 which is moved away from or toward the casing shoulder 18 by the three cams 20 and the three sloping surfaces 80. During such dial rotation, the screw 64 is rotated as a unit therewith so that the force exerted by the range spring 52 on the bimetal 45 is correspondingly varied. A clockwise rotation of dial 72 effects a warmer set point by increasing the pull of the range spring 52 on the bimetal 45; since a higher ambient temperature will increase the pneumatic pressure on the ball valve 44, the extra pressure is compensated for by an increase in tension of the range spring 52 to produce a given pressure at the higher ambient temperature. Conversely, a cooler set point is achieved by a counterclockwise rotation of the dial 72, which decreases the pull of the range spring 52 on the bimetal 45.

With the above arrangement, the pneumatic thermostat has the particular advantage of utilizing a force balance principle with a fixed throttling range. In addition, the present invention presents a miniature one pipe pneumatic thermostat that can be economically manufactured and easily assembled, repaired and calibrated. For instance, when calibration is necessary, no parts have to be removed, since an Allen wrench may be inserted in the dial opening 74 and into the socket of screw 64 to effect relative movement between the dial 72 and the screw 64.

Inasmuch as the preferred embodiment of the present invention is subject to many variations and changes in details, it is intended that all matter contained in the foregoing description or shown on the accompanying drawing shall be interpreted as illustrative and not in a limiting sense.

What is claimed is:

1. A pneumatic thermostat comprising
a casing having pneumatic port means adapted to receive a pneumatic flow,
valve means in said casing controlling said pneumatic port means,
bimetal means for actuating said valve means,
range spring means attached to said bimetal means,
temperature setting means movably disposed on said casing, and
adjustment means defining an operative connection between said temperature setting means and said range spring means for adjusting the same to a desired set point, said adjustment means retaining said temperature setting means in assembled relationship on said casing, and said bimetal means comprising a bimetal element having a central portion engaging said valve means and end portions engaging internal walls of said casing.

2. The invention as recited in claim 1 wherein said bimetal element has edge notches intermediate its end portions, and said range spring means has leg portions received in said notches.

3. The invention as recited in claim 2 wherein said range spring means has a centrally apertured strip extending between its leg portions, and said adjustment means includes adjusting screw means extending through said centrally apertured strip and having a head portion engaging said strip.

4. The invention as recited in claim 3 wherein said temperature setting means includes a dial having a central bore therethrough and said adjusting screw means is threaded into said bore whereby said dial and adjusting screw means are rotated as a unit to adjust the force exerted by said range spring means on said bimetal element.

5. The invention as recited in claim 4 wherein said adjusting screw means has an axial socket communicating with said dial bore whereby a tool may be inserted therein to effect rotation of said adjusting screw means relative to said dial for calibration purposes.

6. The invention as recited in claim 4 wherein said casing has camming surface means thereon and said dial has sloping surface means engaging said camming surface means whereby rotation of said dial effects movement of said adjusting screw means.

7. The invention as recited in claim 6 wherein said casing and said dial are provided with stop means defining limits of rotation for said dial.

8. A pneumatic thermostat comprising a casing having pneumatic port means adapted to receive a pneumatic flow, valve means in said casing including a ball valve cooperating with said pneumatic port means to control the pneumatic flow, an elongated strip of bimetal defining a bimetal actuator for said ball valve, said bimetal actuator having a central portion engaging said ball valve and retaining portions on its opposite ends, means in said casing cooperating with said retaining portions whereby said bimetal actuator is mounted in said casing with its central portion exerting a loading force on said ball valve, and a U-shaped spring having leg portions attached to said bimetal actuator at opposite edges thereof and exerting a biasing force thereon to vary the loading force on said ball valve.

References Cited
UNITED STATES PATENTS

| | | | |
|---|---|---|---|
| 2,486,573 | 11/1949 | Pravda | 236—87 |
| 2,839,248 | 6/1958 | Edwards | 236—87 |
| 3,181,788 | 5/1965 | Norman | 236—87 |
| 3,201,042 | 8/1965 | Norman | 236—87 |
| 3,302,879 | 2/1967 | Good | 236—82 |

WILLIAM J. WYE, *Primary Examiner.*